(12) United States Patent
Carlson

(10) Patent No.: US 12,290,077 B2
(45) Date of Patent: May 6, 2025

(54) SHELLFISH MEAT EXTRACTION DEVICE

(71) Applicant: Eric Carlson, Scarborough, ME (US)

(72) Inventor: Eric Carlson, Scarborough, ME (US)

( * ) Notice: Subject to any disclaimer, the term of this patent is extended or adjusted under 35 U.S.C. 154(b) by 15 days.

(21) Appl. No.: 18/130,289

(22) Filed: Apr. 3, 2023

(65) Prior Publication Data

US 2024/0324614 A1  Oct. 3, 2024

(51) Int. Cl.
*A22C 29/02* (2006.01)

(52) U.S. Cl.
CPC .......... *A22C 29/024* (2013.01); *A22C 29/025* (2013.01); *A22C 29/026* (2013.01)

(58) Field of Classification Search
CPC ..... A22C 29/025; A22C 29/02; A22C 29/024; A22C 29/026
USPC .................................................... 452/2, 5, 8
See application file for complete search history.

(56) References Cited

U.S. PATENT DOCUMENTS

| | | | | |
|---|---|---|---|---|
| 2,838,786 A | * | 6/1958 | Ward | A22C 29/025 452/8 |
| 4,286,356 A | * | 9/1981 | Wenstrom | A22C 29/025 452/140 |
| 4,385,422 A | * | 5/1983 | Ingalls | A22C 29/026 452/8 |
| 4,616,382 A | * | 10/1986 | Van Woensel | A22C 29/026 452/5 |
| 4,912,810 A | * | 4/1990 | Laughlin | A22C 29/026 452/8 |
| 4,941,233 A | * | 7/1990 | Allain | A22C 29/005 452/184 |
| 5,112,269 A | * | 5/1992 | Petersen | A22C 29/026 452/8 |
| 5,839,952 A | * | 11/1998 | Pollingue | A22C 29/026 452/8 |
| 6,102,790 A | * | 8/2000 | Cowsar | A22C 29/026 452/8 |
| 6,129,624 A | * | 10/2000 | Niklason | A22C 25/145 452/106 |

* cited by examiner

*Primary Examiner* — David J Parsley

(57) ABSTRACT

A shellfish meat extraction device that automates that process of extracting meat from shellfish parts, such as lobster claws, by using pressurized tubes to grip the parts and then bursts of pressure to effectively shoot the meat out of the part, after which the empty shell is discarded and the process repeated.

7 Claims, 6 Drawing Sheets

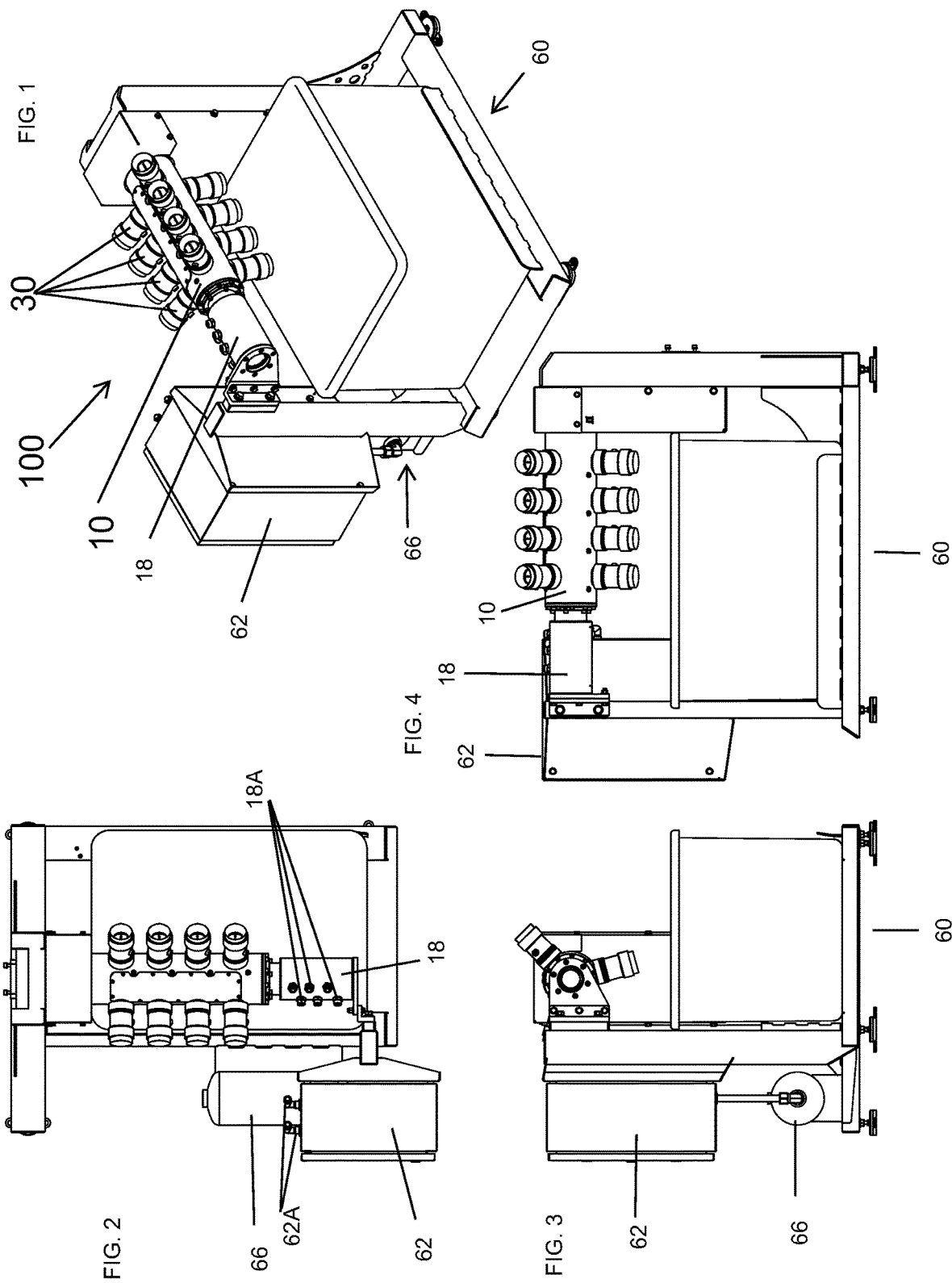

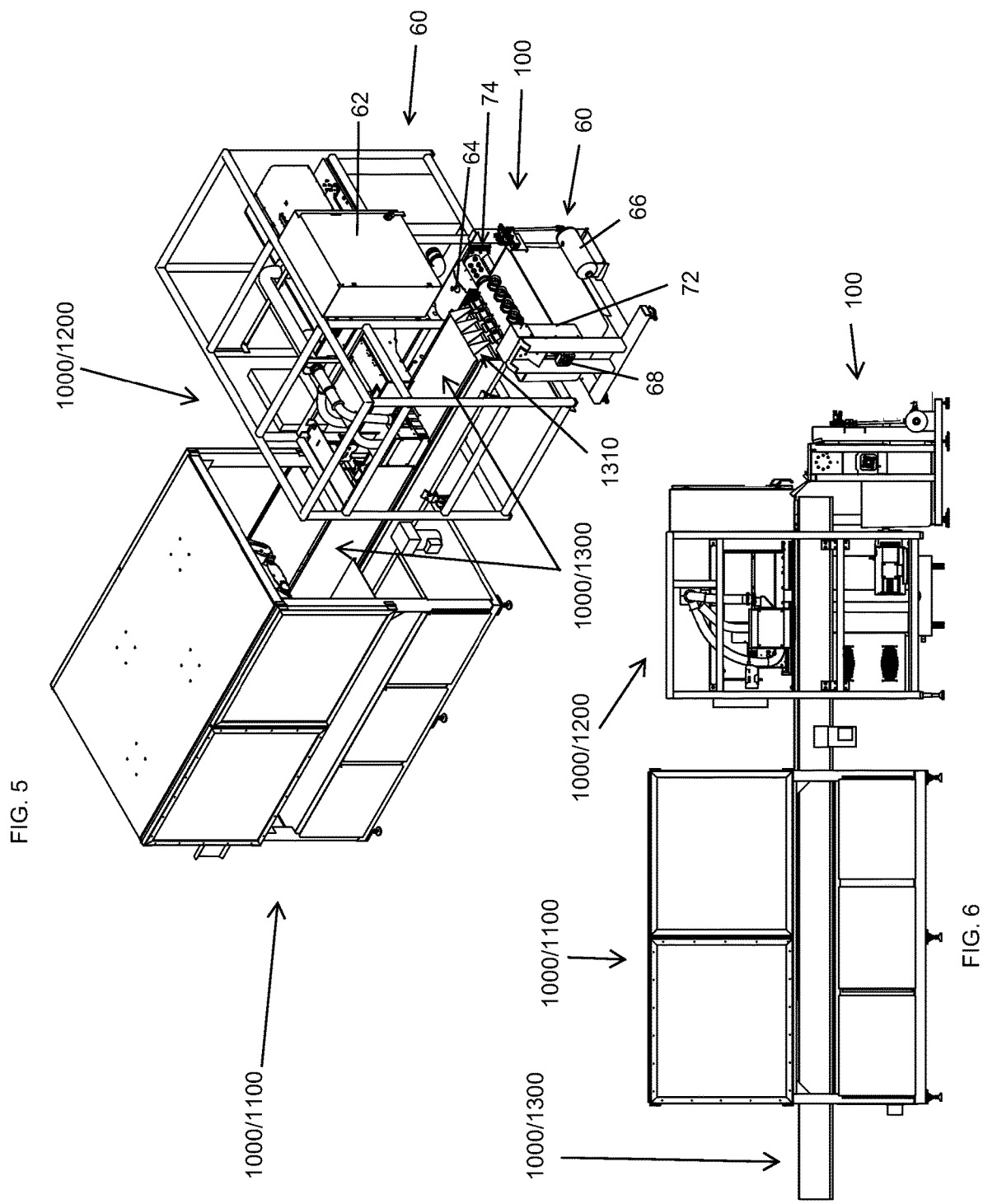

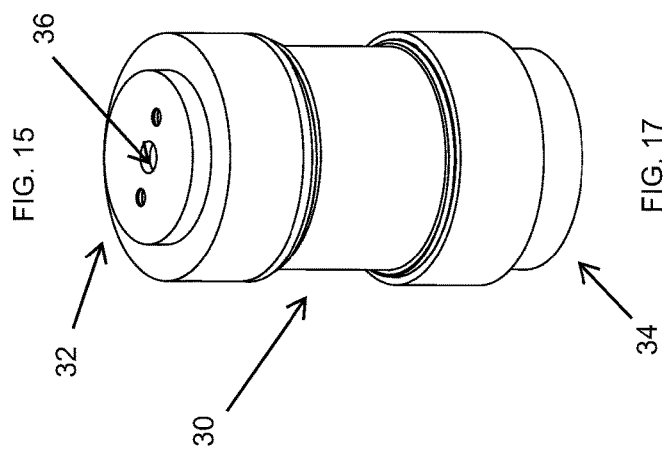
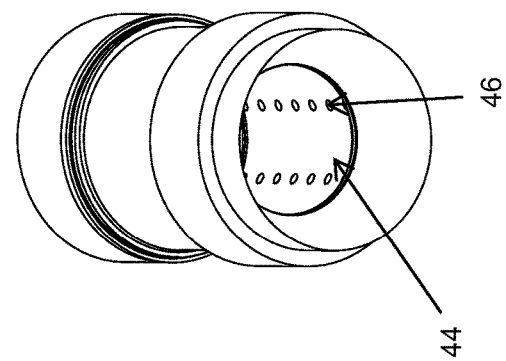
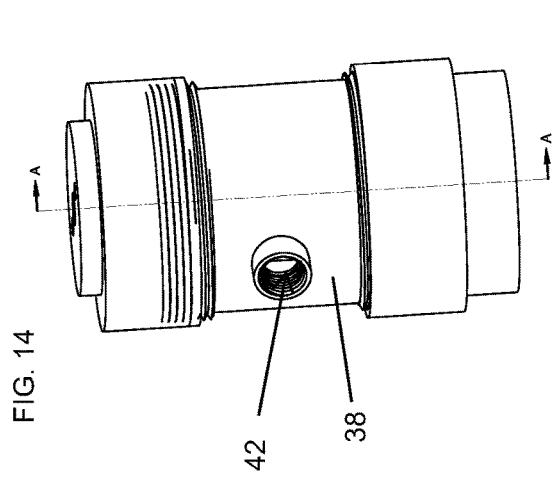
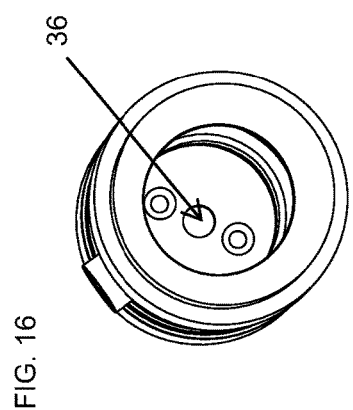
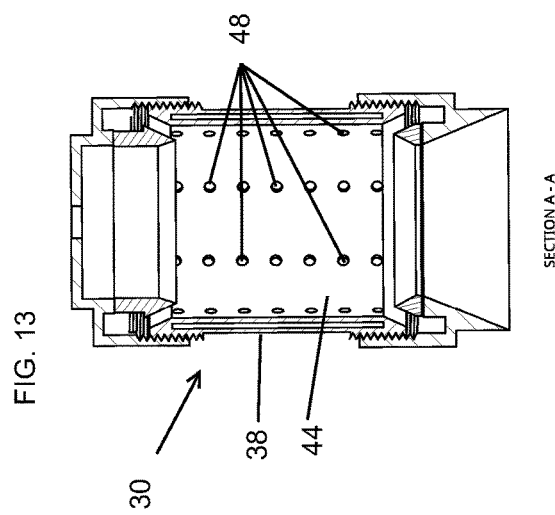

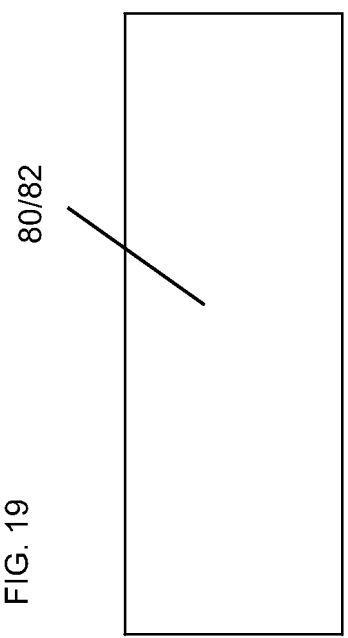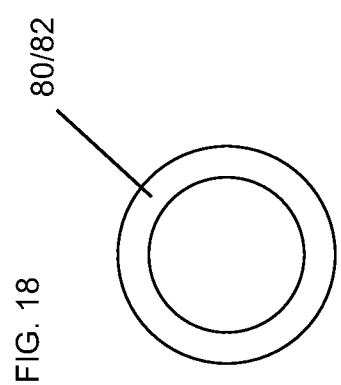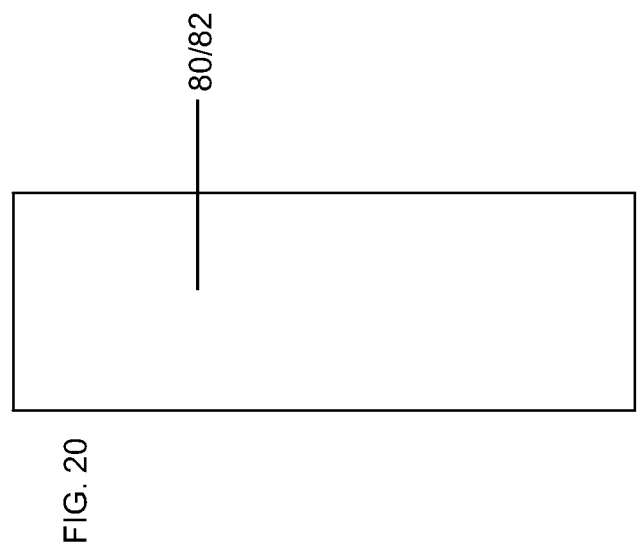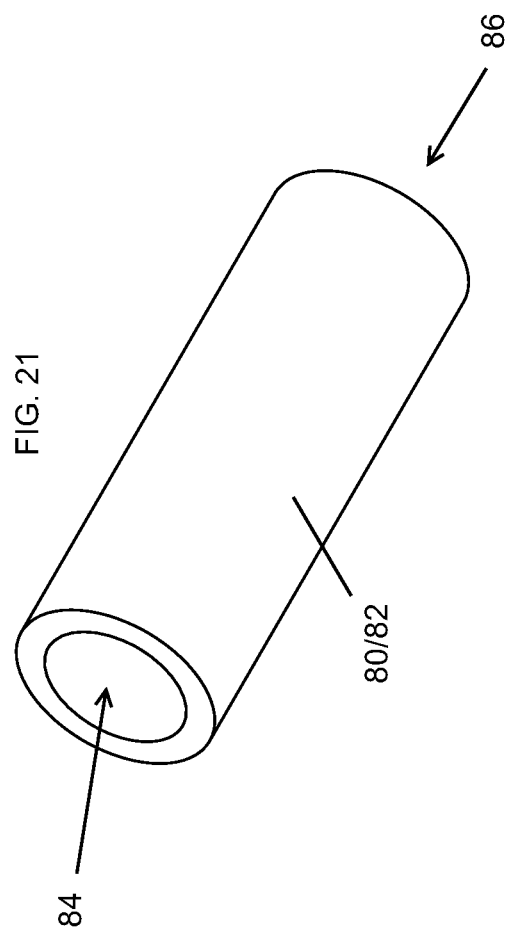

SHELLFISH MEAT EXTRACTION DEVICE

BACKGROUND INFORMATION

Field of the Invention

The invention relates to devices used to deshell shellfish, for example, lobsters.

Discussion of Prior Art

The process of deshelling shellfish is an inherently tedious process. With lobsters, for example, the bulk of the edible meat is found in the claws, knuckles, and tail, constituting seven different pieces to deshell per lobster, each of which presents its own challenges. Further, considering the very different structures of the claws, knuckles, and tails, developing automated means for extracting the meat has proven difficult.

Additionally, due to these complexities most attempts to automate the process have proven to be quite costly. As a result, deshelling shellfish remains a process that is typically very time consuming and that involves a lot of manual labor.

What is needed, therefore, is a device that automates the deshelling process in a cost effective manner.

BRIEF SUMMARY OF THE INVENTION

The invention is a shellfish meat extraction device that, in broad terms, uses a burst of compressed air to blast meat out of a shell. The device is configured to receive parts from shellfish that either have openings in their shell or have shells that have been cut. For example, a lobster's knuckle is open on either end and may be accepted into the device without further alteration, whereas a lobster claw is first cut around the perimeter.

The device includes a custom designed blow tube which uses a silicone liner, or bladder, placed inside the blow tube that, when pressurized, wraps and creates a seal around the knuckle or claw. When the blow tube is ready to accept a claw or knuckle, a vacuum is applied to the blow tube to pull the bladder back against the inner walls of the blow tube to create space that allows the part to fall into the tube. Once the part is in the blow tube, the tube is pressurized to create the sealed blow chamber. A blast of air is then sent to this chamber from an airline connected to the blow cap on one end of the blow tube and, due to the bladder seal, air is directed through the inside of the knuckle shell, or out the laser cut hole in the claw, taking the claw and knuckle meat with it. Once the meat is removed, the bladder can be put under vacuum again which allows the removal of the empty shell and provides clearance for the next shellfish part to be received, restarting the cycle.

The device includes a cylindrical rotary drum that moves a plurality of blow tubes through three different positions, a first position where the shellfish part is received, a second position where the meat is extracted, and third position where the shell is discarded. For example, one embodiment may include 12 blow tubes arranged on the cylindrical drum in three rows of four. Each row, designated "A" through "C" for the purposes of this description, is approximately 120 degrees from the other two rows and the blow tubes in each row are spaced approximately 4.5" center to center. The drum rotates in one direction to service the three positions. The receiving position, Position 1, has Row "A" aligned with conveyor belt chutes for accepting new lobster arms from the belt. The blow position, Position 2, has Row "A" aligned so the meat can be blown out from the shell onto an output conveyor. The shell discard position, Position 3, has Row "A" aligned with the discard conveyor or receptacle to accept shell waste. Then Row "A" is in Position 1, Row "B" is in Position 2 and Row "C" is in Position 3. Internal to the drum are six air headers, fed into the drum through a six-port rotary union. There are two headers/ports supporting each of the three rows: one for the four Bladders and one for the four Blow Caps.

In this previous example, the control sequence is as follows starting with row "A" in Position 1 and the bladders of Row "A" under vacuum and at a 45 degree angle from the delivery conveyor. First, four lobster arms, i.e. claws or knuckle, fall off the conveyor onto the four chutes which direct one arm into its respective Blow Tube of row "A". There is a photo-eye that is installed on an alignment guide that is configured to start a timer when the arms fall. Second, a pre-programmed delay allows the arms to settle into the blow tubes, the bladders of row "A" are slightly pressurized, for example with 7 pounds per square inch of pressure ("PSI"), and the drum rotates to Position 2. Third, just prior to reaching position 2, a short burst of air, for example around 50 PSI, is sent to the blow cap which sends the meat onto the output conveyor. Fourth, with pressure still applied to the bladder of row "A", and once triggered by lobster arms falling into Row "B" at Position 1, the drum rotates to Position 3 and just prior to reaching position 3, the bladder is put under vacuum to allow the empty shell to fall onto the discard conveyor or receptacle. An additional short burst of air, for example 50 psi, is sent to the blow cap to assist in removing the empty shell as well as any fluid deposit or other waste product. A second through beam photo eye signals that all shell parts have been removed from the blow tube to allow rotation. With vacuum maintained in the bladder, and once triggered by lobster arms falling into Row "C" at Position 1, the drum will rotate and return to Row "A" in Position 1, ready to receive another four lobster arms from the conveyor.

BRIEF DESCRIPTION OF THE DRAWINGS

The present invention is described with reference to the accompanying drawings. In the drawings, like reference numbers indicate identical or functionally similar elements. The drawings are not drawn to scale.

FIG. 1 is a perspective view of a deshelling device according to the invention connected to a processing conveyor system.

FIG. 2 is a top plan view of the device shown in FIG. 1.

FIG. 3 is an end view of the device shown in FIG. 1.

FIG. 4 is a front side view of the device shown in FIG. 1.

FIG. 5 is a perspective view of a deshelling apparatus.

FIG. 6 is a side view of the apparatus shown in FIG. 5.

FIG. 13 is a cross-section view of FIG. 14 along the A line.

FIG. 14 is a perspective view of the blow tube illustration and the vacuum inlet.

FIG. 15 is a perspective view of the blow tube showing the end that attaches to the rotary drum.

FIG. 16 is a perspective view of the blow tube showing the open (receiving) end of the tube to the blower opening and attachment means.

FIG. 17 is a perspective view of the blow tube showing the open (receiving) end of the tube to the blower opening and inner wall.

FIG. 18 is a top view of a liner.

FIG. 19 is a side view of the liner.

FIG. 20 is a side view of the liner.

FIG. 21 is a perspective view of the liner

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 7:
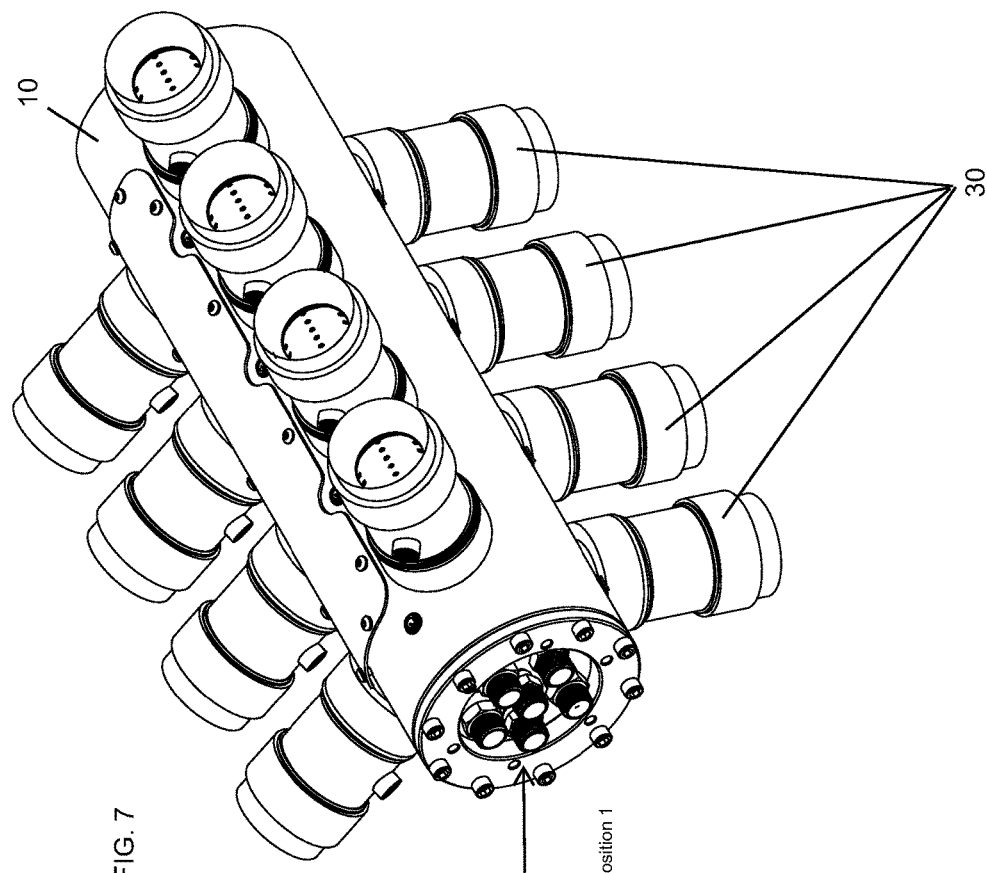
FIG. 7 is a perspective view of the rotating drum and blow tubes.
Figure 8:
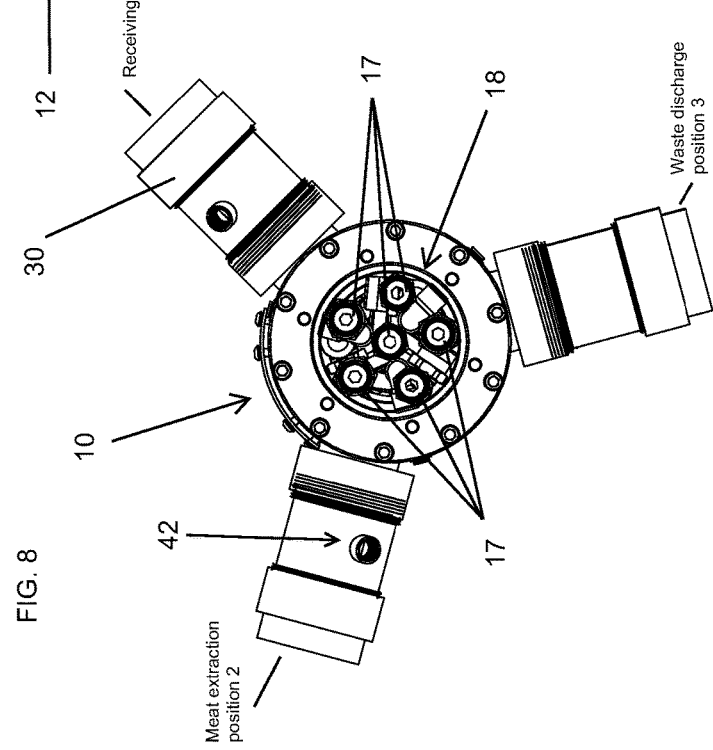
FIG. 8 is an end view of the rotating drum and blow tubes.
Figure 10:
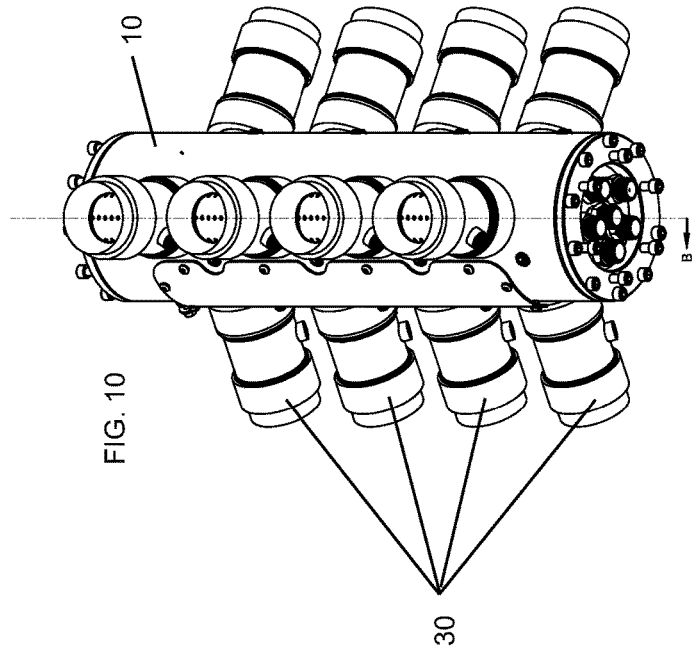
FIG. 10 is a perspective view of the rotary drum with blow tubes showing the top, end and sides.
Figure 12:
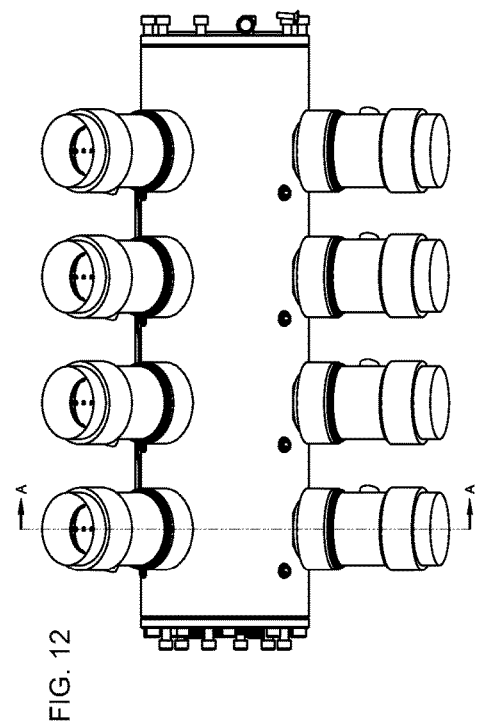
FIG. 12 is a perspective view of the rotary drum showing the bottom and ends.
Figure 9:
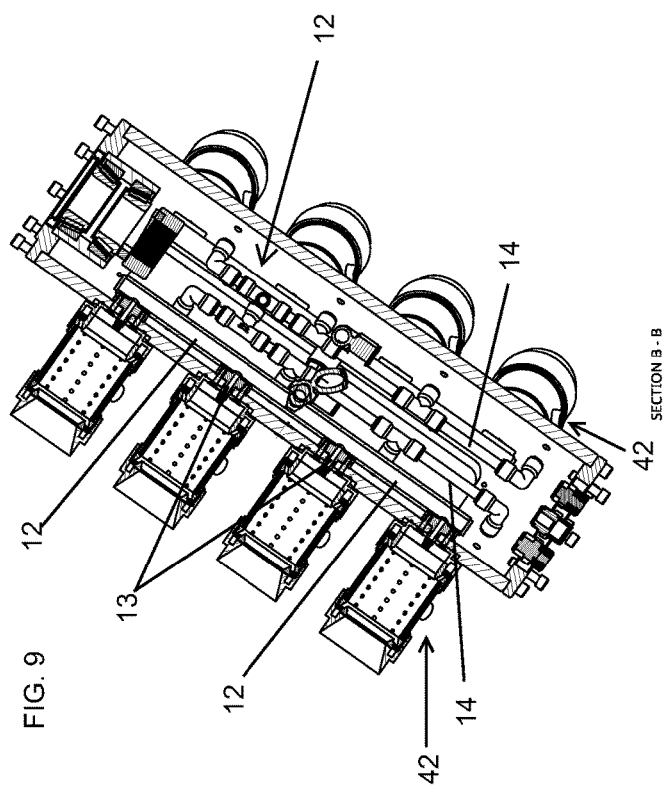
FIG. 9 is a cross-sectional view of FIG. 10 along the B line.
Figure 11:
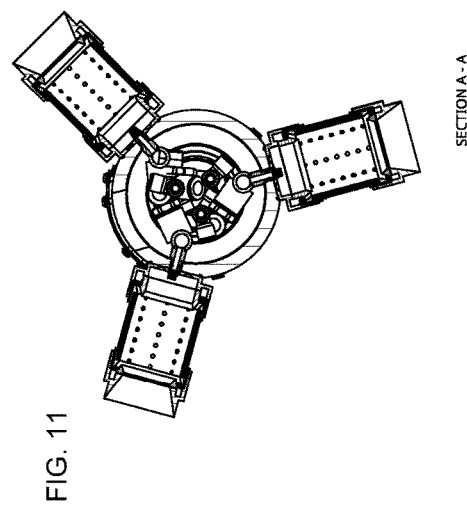
FIG. 11 is a cross-sectional view of FIG. 12 along the A line.

FIGS. 1-21 illustrate a deshelling device 100 for deshelling shellfish parts, such as a lobster's claws and knuckles. The deshelling device primarily uses a rotating device 10 to move a plurality of blow tubes 30 from a receiving position 1, shown, for example, in FIG. 8, where the tubes 30 receive a shellfish part, an extraction position 2 where compressed air forces meat out of the shell, and a discard position 3 where the empty shell is discarded from the blower tube. A support structure 60 supports the rotating device in the desired position and supports the other required components, as discussed in more detail herein.

The device 100 and method of use may be deployed to extract meat from a number of types of shellfish as well as a number of different parts from the different shellfish. However, it is particularly well suited for lobster claws that have been cut around a perimeter of the claw, or lobster knuckles that are naturally open on either end. FIGS. 5 and 6 illustrate a complete deshelling assembly 1000 that includes a robotic shellfish butchering and product positioning station 1100 and a laser cutting assembly 1200, along with a conveyor assembly 1300 that are collectively configured to deliver the shellfish parts to the deshelling device 100. The robotic shellfish butchering and product positioning station, laser cutting assembly, and conveyor assembly may be configured in a number of ways, for example, as shown in U.S. Pat. No. 10,021,886 and/or 10,194,670, each of which are incorporated by reference herein.

The rotating device 10, in this embodiment shown as a cylindrical rotating drum 10 that is best shown in FIGS. 7-12, is configured to support three rows of blow tubes 30, one row in position 1, one in position 2, and one in position 3. Included within the rotating drum 10 is a first conduit 12, which is in the form of a blow tube manifold 12, that connects each row of blow tubes 30 to a blowing device such as an air compressor, and a second conduit 14 that is connected to a both a vacuum pump and a blowing device such as an air compressor. In the embodiment shown, additional components are provided to complete the connection between the air compressor and vacuum pump and the respective blow tubes, including six air heads 17 that are fed into the rotating device 10 through a six-port rotary union 18. The six ports are configured to provide two ports for each of the three rows, specifically, one for the first conduits and one for the second conduits in each row. The manifold 12 has additional connector lines 13 for each blow tube 30, shown in FIG. 9, and the second conduit 14 has connector lines (not shown) to attach to each blow tube 30 at opening 42. A conventional valve, such as a solenoid valve, is used to switch the second conduit between the vacuum pump and the air compressor.

Each blow tube 30, best shown in FIGS. 13-17, has a first end 32 and a second end 34, with the first end 32 configured to be open and ready to accept a shellfish part and the second end 34 secured to the rotary drum 10, the second end 32 having a first opening 36 to attach to the first conduit 12. A sidewall 38 of the blow tube 30 also has a second opening 42 to attach to a second conduit 14. The blow tube's sidewall is also an outer body that is essentially airtight. The blow tube 30 also has an inner body 44 that is similar in shape as the outer body 38 but slightly smaller in size such that inner body 44 fits inside the outer body 38 with a small gap between the inner 44 and outer 38 bodies, for example, 1/16 of an inch. The inner body 44 is lined with a plurality of relatively evenly distributed openings 46. In the embodiment shown, the first end 32 includes two other openings 48 that are used to secure the blow tube 30 to the rotating device 10, for example, by using threated fasteners.

A soft liner 80, illustrated in FIGS. 18-21, is placed inside the inner body 44. The liner 80 is generally cylindrical in shape to match the shape of the blow tube 30, having a sidewall 82 that is completely closed with a first end 84 and second end 86 that are each open. The liner 80 may be made from a number of suitable materials such as, for example, silicone or synthetic rubber.

The support structure 60, best illustrated in FIG. 5, includes a number of conventional components to operate the device, including a control panel 62, a vacuum pump 64, an air compressor 66, a servomotor 68, and a drive assembly 72 that is comprised of conventional gears and belts. These components are collectively configured and deployed using conventional techniques in conventional manners to deliver compressed air and vacuum pressure to the blow tubes to inflate and contract the silicone tubes around shellfish parts and the other to blow the meat out of the shell, and, separately, to move the rotary drum through its various positions. Referring to FIGS. 1 and 2, six connector lines (not shown) connect outlets 62A on the control panel 62 to ports 18A on the rotary union 18 to connect the air compressor and vacuum pump to the rotary drum 10.

An angled offshoot 1310, shown in FIG. 5, from the conveyor to the blow tube 30 directs the part into the tube 30 as it falls off the end of the conveyor. In the first position, row A blow tubes 30 are angled towards the angled offshoot from the conveyor 1300 and delivers the shellfish parts to the blow tubes 30 on the rotary device 10. At position 1, a vacuum pump is activated through port 42 for blow tubes 30 in position 1 as the receiving position, which causes the soft silicone liner 80 to be retract against the inner body 46, which in turn causes the space inside the blow tube 30 to expand and allow for easy insertion of the shellfish part. After the delivery conveyor distributes shellfish parts into each of the blow tubes 30 in row A the vacuum is deactivated and the compressor delivers a small amount of compressed air, for example around 5 PSI through port 42. The compressed air evenly pushes against the liner 80 which causes the silicone liner to effectively grip the shellfish part. When under pressure, the silicone liner 80 acts as a sealed blow chamber such that air is only able to go in the first end of the blow tube 30 and out of the second end.

Once the shellfish part is gripped, the rotary drum 10 rotates roughly 120 degrees such that the blow tubes 30 in row A are rotated to position 2 and are ready for blowing the meat from the shell. The air compressor 66 delivers a strong burst of compressed air, for example a 50 PSI burst, which forces the meat to shoot out of the shell and land on an outlet conveyor (not shown).

The rotary drum 10 then rotates again, moving roughly 120 degrees such that the row A blow tubes that were in position 2 move to position 3. The vacuum 64 is then activated through the port 42 to again retract the liner 80 to release the empty shell and the air compressor 66 is briefly activated to force out any shell pieces that may become stuck to the liner. The rotary drum 10 then moves row A another 120 degrees at which point the blow tubes are ready to receive another shellfish part in position 1.

The three rows A, B, and C, of blow tubes 30 ensure that there is always a tube 30 in each position, 1, 2, and 3.

The control panel 62 includes a conventional logic processor with conventional input and output options that allow an operator to control the device 100. For example, the control panel 62 is configured to allow an operator to alter the amount of pressure that is provided by an air compressor and/or vacuum pump. A single compressor may be deployed with two pressure regulators to deliver different amounts of pressure to the two input ports on each row of blow tubes 30.

The control panel 62 may also work in conjunction with a conventional sensor, such as a conventional photo eye sensor 74, to control when the rotating device 10 transitions from one position to the next. For example, for the blow tubes in position 1 the sensor 74 may be used to detect when a shellfish part has started to enter the bow tube 30, after which it may use a conventional timer to wait a predetermined amount of time to switch from the vacuum pump to the air compressor so as to grip the shellfish part in the blow tube 30. In the discard position 3 a sensor 74 may be used to ensure that all of the tubes have been emptied, for example, by waiting until there are no obstacles across the ends of the blow tubes, which indicates all of the empty shells have left the blow tubes. The control panel may also control the deshelling assembly 1000, and importantly may be configured to stop the conveyor if the device 100 takes more than a predetermined amount of time in any of the positions, e.g. if it takes longer than a certain time to discard the shell parts.

It is understood that the embodiments described herein are merely illustrative of the present invention. Variations in the construction of the shellfish deshelling device may be contemplated by one skilled in the art without limiting the intended scope of the invention herein disclosed and as defined by the following claims.

What is claimed is:

1. A shellfish meat extraction device that is configured to extract meat from a shellfish part, the shellfish meat extraction device comprising:
   one or more blow tubes and one or more first conduits, each of the one or more blow tubes connected to one of the one or more first conduits, the one or more first conduits connected to a blowing device;
   one or more second conduits, each of the one or more second conduits connecting one of the one or more blow tubes to the blowing device and to a vacuum device, and wherein the second conduit is configured to provide either a vacuum effect or a pressurized effect on the interior of the blow tube;
   a liner that fits inside the blow tube, the liner configured to retract outwards towards inner sides of the blow tubes when the second conduit provides a vacuum force from the vacuum device, the liner configured to press inwards towards a middle of the blow tube when pressure is applied through the second conduit to create a blow chamber inside the blow tube;
   the blowing device adapted to deliver a burst of pressure to the blow tube, and wherein the burst of pressure forces meat out of the shellfish part.

2. The device of claim 1, further including a rotating device and wherein the one or more blow tubes are attached to the rotating device, the rotating device configured to rotate between one or more different positions.

3. The device of claim 2, wherein the one or more blow tubes includes a plurality of blow tubes arranged in rows around the rotating device such that there is a row of blow tubes in at least a first position, a second position, and a third position, and wherein in the first position, the blow tubes are positioned to receive the shellfish part, in the second position the blow tubes are positioned to extract the meat, and in the third position the blow tubes are positioned to discard the shellfish part.

4. The device of claim 1, wherein the blow tube has an inner body and an outer body, and wherein the outer body is approximately airtight and the inner body has a plurality of openings.

5. The device of claim 4, wherein there is a gap between the inner body and the outer body.

6. The device of claim 2, the rotating device further including a manifold, the manifold connecting each row of blow tubes to the conduits.

7. The device of claim 3, further including a control panel and a sensor, and wherein the sensor is configured to alert the control panel when a shellfish part has entered a blow tube, and the control panel is programmed to wait a predetermined amount of time before moving the rotating device to a different position.

* * * * *